Patented May 24, 1932

1,859,684

UNITED STATES PATENT OFFICE

KARL STREITWOLF, OF FRANKFORT-ON-THE-MAIN, ALFRED FEHRLE, OF BAD-SODEN-ON-THE-TAUNUS, AND WALTER HERRMANN AND PAUL FRITZSCHE, OF FRANKFORT-ON-THE-MAIN, GERMANY, ASSIGNORS TO WINTHROP CHEMICAL COMPANY, INC., OF NEW YORK, N. Y., A CORPORATION OF NEW YORK

HYDROXY-ETHYLAMINO SALTS OF 3-ACETYLAMINO-4-HYDROXY-BENZENE-ARSONIC ACID

No Drawing. Application filed January 4, 1930, Serial No. 418,648, and in Germany June 14, 1929.

The present invention relates to hydroxy-ethylamino salts of 3-acetylamino-4-hydroxy-benzene-arsonic acid.

We have found that the 3-acetylamino-4-hydroxy-benzene-arsonic acid used to a great extent in the therapy of syphilis forms with hydroxy-ethylamine well crystallizing salts which are readily soluble in water. Our new salts have, in contradistinction to the hitherto known salts of this acid, the advantage that the human body has a better tolerance to them, that they have an enhanced solubility and a greater stability in solution. They are, therefore, well suited for use in medicine, especially for the treatment of children. The salts formed need not first be isolated, but the solutions obtained by combining the components in an aqueous median may be used directly. In order to increase the stability of the solutions it is advisable to add small quantities of sodium sulfite to the solutions.

The following example serves to illustrate the invention, but it is not intended to limit it thereto.

A paste is made of 275 grams of 3-acetylamino-4-hydroxy-benzene-arsonic acid and 220 cc. of water, 61 grams of hydroxy-ethylamine and 20 cc. of water are added thereto. After the mass has been dissolved by boiling up, 9 grams of decolorizing coal are added thereto and the whole is filtered. The filtrate (350 cc.) is mixed with 70 cc. of acetone, and 350 cc. of alcohol are then introduced into the mixture. After a short time the p-hydroxy-m-acetylamino-phenyl-ω-hydroxyethylamino arsonic acid of the following probable formula:

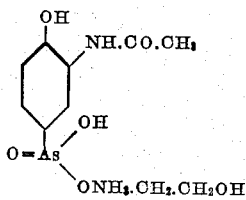

crystallizes out. It is filtered by suction, washed with alcohol and ether and dried in a vacuum. The product forms a white crystallized power which is soluble in 1.5 to 2 parts of water of 35° C. and difficultly soluble in acetone, ether and benzene.

By dissolving the acid with 2 mol. of the base, the corresponding di-salt of the following probable formula:

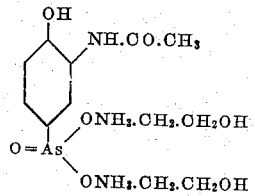

is obtained.

We claim:

1. As new products hydroxy-ethylamino salts of 3-acetylamino-4-hydroxy-benzene-arsonic acid being well crystallized compounds, rather readily soluble in water, difficultly soluble in acetone, ether and benzene.

2. As a new product, the salt of the following probable formula:

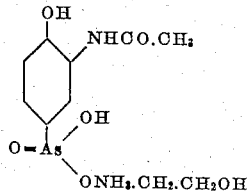

formed by the action of one molecule of hydroxy-ethylamine upon one molecule of 3-acetylamino-4-hydroxy-benzene-arsonic acid, being a white crystallized powder which is soluble in 1.5 to 2 parts of water of 35° C. and difficultly soluble in acetone, ether and benzene.

3. As a new product, the salt of the following probable formula:

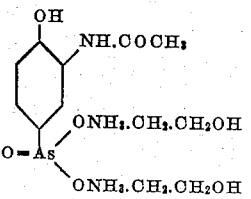

formed by the action of two molecules of hydroxy-ethylamine upon one molecule of 3-acetylamino-4-hydroxybenzene arsonic acid, being a white crystallized powder, well soluble in water and difficultly soluble in acetone, ether and benzene.

In testimony whereof, we affix our signatures.

KARL STREITWOLF.
ALFRED FEHRLE.
WALTER HERRMANN.
PAUL FRITZSCHE.